Oct. 30, 1962 G. E. KINDLIEN ET AL 3,061,059
CYCLE CLUTCH MECHANISM
Filed April 7, 1961
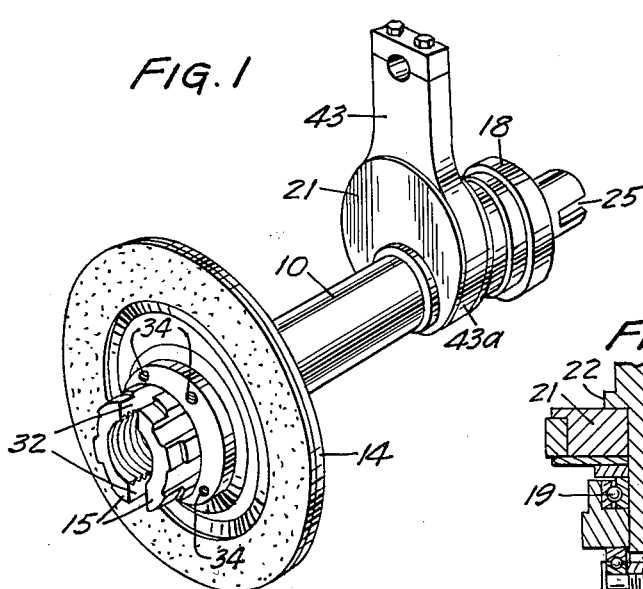
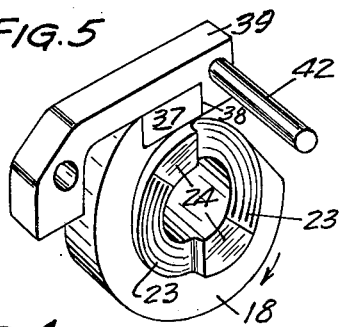
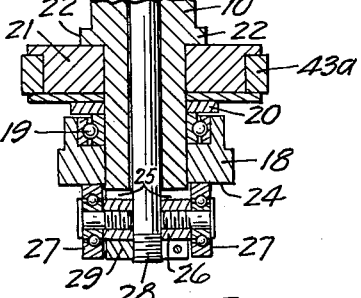
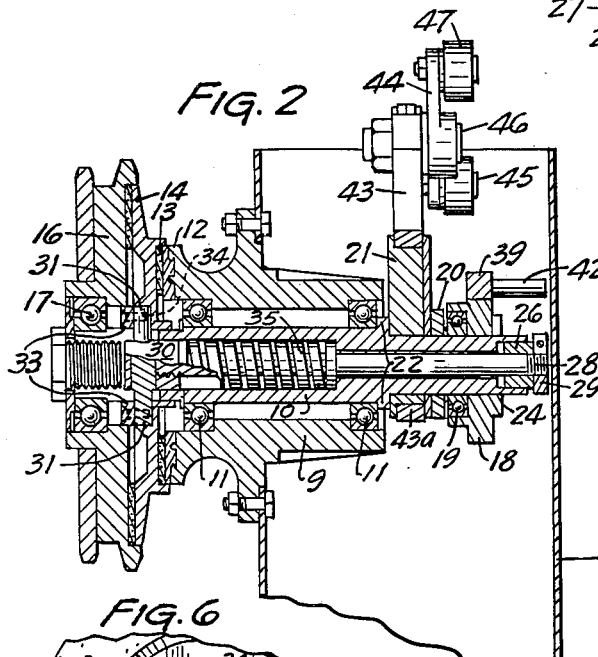
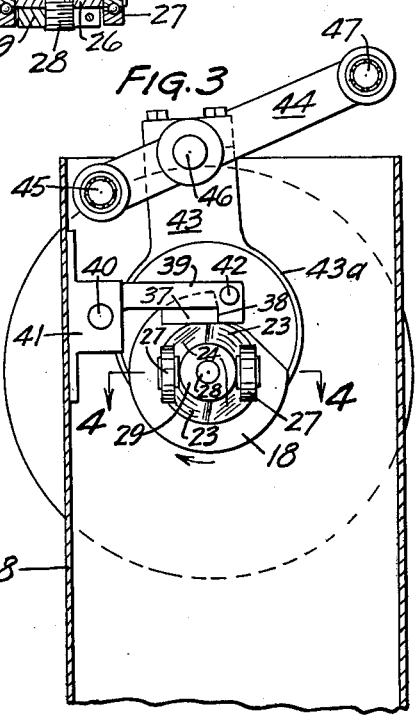
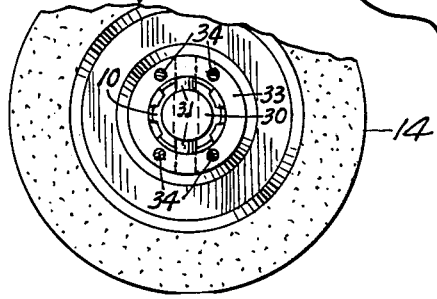
INVENTORS
GORDON E. KINDLIEN
RAYMOND C. ROTHI
BY John E. Stephen
ATTORNEY

United States Patent Office 3,061,059
Patented Oct. 30, 1962

3,061,059
CYCLE CLUTCH MECHANISM
Gordon E. Kindlien and Raymond C. Rothi, St. Paul, Minn., assignors to K & N Machine Works, Inc., St. Paul, Minn., a corporation of Minnesota
Filed Apr. 7, 1961, Ser. No. 101,580
7 Claims. (Cl. 192—18)

This invention relates to clutch mechanism for connecting a shaft to a power source and automatically interrupting rotation of the shaft when it has rotated to a predetermined position.

It is an object of our invention to provide novel, compact and reliable mechanism of the class described for intermittently rotating and stopping a shaft, including clutch and brake means adapted to coact with a continuously rotating power-driven member, cam means operatively connected to the clutch means, and detent means for positively stopping the cam means and shaft in a predetermined position.

The invention also includes certain other novel features of construction which will be more fully pointed out in the following specification and claims.

Referring to the accompanying drawing which illustrates a preferred embodiment of our invention, by way of example and not for the purpose of limitation:

FIGURE 1 is a perspective view showing the hollow shaft, clutch disk and cam;

FIG. 2 is a central, longitudinal, vertical sectional view showing our improved cycle clutch mechanism, together with supporting housing and crank case members;

FIG. 3 is an end view of the mechanism as viewed from the right end of FIG. 2;

FIG. 4 is a fragmentary cross sectional view, taken on the line 4—4 of FIG. 3;

FIG. 5 is a perspective view showing the clutch actuating cam and detent or cam stop members, and FIG. 6 is an end view of the hollow shaft as viewed from the left of FIG. 2 showing particularly the means for connecting the shaft to the clutch disk.

In the drawing, our clutch mechanism is shown as mounted on a crank case member 8 to which is bolted a shaft housing and bearing support, indicated generally by the numeral 9, for a hollow shaft 10. Anti-friction bearings 11 are provided between the shaft 10 and housing 9 and the left end of the housing 9 (FIG. 2) is formed with an annular brake flange 12 adapted to be engaged by a brake disk 13 carried by a clutch disk 14.

Clutch disk 14 is longitudinally movable on shaft 10, having a splined connection therewith, as indicated at 15 in FIG. 1. Power for turning the shaft 10 may be transmitted to a power source member indicated generally by the numeral 16. This member may be in the nature of a fly wheel and is provided, as shown, with a peripheral groove and sprocket wheel upon which a power-driven belt or sprocket chain may be trained. An anti-friction bearing 17 is interposed between the inner periphery of the member 16 and shaft 10, and the face of the member 16 adjacent to the clutch disk 14 is formed for frictional engagement with the clutch disk. Thus the member 16 is free to rotate on the shaft 10 when the clutch disk is retracted to free the shaft.

Cam means are provided for alternately moving the clutch disk 14 between its position in engagement with the brake flange 12 and its position in operative engagement with the power source member 16. Our cam actuating means comprises a cam member 18 which is revolubly mounted on the shaft 10 and has an anti-friction bearing 19 interposed between it and the shaft. The bearing 19 is also disposed to transmit end thrust from the cam 18 to a spacer 20 and thence to a driven member 21 which is fixed on the shaft 10 against a flange 22 formed thereon. A pair of lobes are formed on the outer face of the cam 18 and have inclined segments 23 extending in continuation of projecting segments 24.

The right end portion (FIGS. 1 and 2) of the shaft 10 is formed with longitudinally extending guide slots 25 to slidably receive a head 26 carrying cam follower rollers 27. These rollers project laterally from opposite sides of the head 26 and shaft 10, being disposed to make continuous contact with the lobes of the cam 18. The head 26 carrying the rollers 27 is rigidly secured to a plunger 28 which is confined in the hollow of the shaft 10 and movable longitudinally therein. A threaded end portion of the plunger 28 is fitted with a lock nut 29 which forms an abutment for the head 26. At its opposite end the plunger 28 is rigidly connected to the clutch disk 14 by connecting members which include a head 30 having a threaded connection with the plunger 28 and fitting loosely in the bore of the shaft 10. Laterally projecting members 31 are carried by the head 30 and project through slots 32 in the shaft 10 adjacent to the outer face of the clutch disk 14. The members 31 are connected by a ring 33 and machine screws 34 to the clutch disk 14. The screws 34 engage the clutch disk 14 in tapped holes formed in the face of the disk.

A compression spring 35 is confined within the hollow of the shaft 10 and is operatively connected to the clutch disk 14 to bias it toward its position in engagement with the power source member 16, while retaining the cam follower rollers 27 in rolling engagement with the lobes of the cam 18. As shown in FIG. 2, the compression spring 35 embraces the plunger 28 and is confined at one end by a shoulder formed on the shaft 10 and at the other end by an end surface of the head 30.

We provide means for alternately releasing the cam 18 for rotary movement on the shaft 10 and then stopping its rotary turning movement in a predetermined position. For this purpose the periphery of the cam 18 is provided with a projecting detent member 37 (hereinafter referred to as "first detent member") and an adjacent recess segment defining a substantially radially extending stop surface 38 adapted to be engaged by a coacting surface formed on a relatively movable second detent member 39. This member is pivotally supported on a pin 40 carried by a bracket 41 which is secured to a wall of the casing member 8. A detent trip pin 42 projects from the detent member 39 to be actuated to disengage this detent member 39 from the surface 38 of the first detent member 37.

Any suitable linkage may be provided to transmit power from the driven member 21 to a tool or other mechanism which is to be operated intermittently. As shown, the driven member 21 has a cylindrical periphery disposed eccentrically to the shaft 10 upon which this member is fixed, and a pitman 43 is operatively connected by a peripheral loop member 43a to the member 21. As further shown in FIGS. 2 and 3, the link members connected to the pitman 43 may include a lever 44 having a fulcrum pin 45 suitably supported on the crank case member 8 and connected by a pin 46 to the pitman 43. A free end portion of the lever 44 has a bearing member 47 which may be connected to the tool or other member to be operated intermittently.

In operation it may be assumed that the clutch disk 14 is disengaged from the power source member 16, that the latter is being rotated continuously by the power actuating means in the direction indicated by an arrow in FIG. 3, and that the detent member 39 is in engagement with the projecting member 37 of the cam 18. At such time in each cycle of operation the cam follower rollers 27 are at rest on the projecting cam segments 24 and the spring 35 is held under maximum compression by end thrust transmitted from the follower rollers 27 through the plunger 28, and head 30 fixed on the plunger. Also, the clutch disk 14 is retained in its retracted position in which the brake disk 13 carried by the clutch disk is under pressure in contact with the brake flange 12 of the shaft housing 9, thereby retaining the shaft in a predetermined position with the pitman 43 at the upper end of its stroke.

To cause the shaft 10 to rotate through a predetermined angle or cycle, it is only necessary to raise the trip pin 42 momentarily, thereby disengaging the second detent member 39 from the first detent member 37. When the cam 18 is thus released, the cam follower rollers 27, by reason of their pressure on the cam lobes, cause the cam to rotate relative to the shaft 10 approximately one-half of a revolution in a forward direction. This allows the spring 35 to expand and force the clutch disk 14 from its braking position to its clutch engagement position in which it is held in firm engagement with the power source member 16.

If the second detent member 39 is allowed to return to the periphery of the cam 18 immediately after it has been disengaged from the first detent member 37, the free end portion of the second member 39 will ride on the periphery of the cam 18 while the cam turns with the shaft 10 to its starting position of 360° in the embodiment illustrated. Thereupon the rotation of the cam is stopped and the momentum of the shaft 10 and connected members, including the clutch disk 14, is sufficient to cause the spring 35 to be compressed by the riding of the cam follower rollers 27 up the inclined segments 23 to a cycle end position of rest on the projecting segments 24. By the time the rollers reach the projecting segments 24, the clutch disk has been withdrawn from the driving member 16 and the braking force has been applied to the fixed flange 12 to stop the shaft 10 precisely in its predetermined position in which the pitman member 43 and connected lever 44 are in their elevated positions best shown in FIG. 3.

It will be evident that during each cycle of rotation of the shaft 10, the free end of the lever 44 is moved through a complete cycle together with any tool or other mechanism connected thereto. If the mechanism is to be operated through a plurality of cycles without interruption, it is only necessary to retain the second detent member 39 in its retracted or raised position while the cam 18 is rotated with the shaft 10 through the required number of revolutions. It is also possible by suitable changes in the number and angular positions of the cam lobes to stop the rotation of the shaft in a predetermined position after it has rotated through an angle less than 360°.

Our invention is characterized by its unique compactness, simplicity, and reliability in operation.

We claim:

1. Cycle clutch mechanism comprising, a hollow rotary shaft having a supporting bearing; a rotary power source member revolubly mounted on said shaft and adapted to be rotated continuously; a clutch member connected to said shaft to rotate therewith and movable axially thereof to and from driving engagement with said power source member; a fixed brake member engageable by said clutch member when the clutch member is in a retracted position; a cam rotatable on said shaft in longitudinally spaced relation to said clutch member, said cam having a lobe projecting from a face thereof; a head connected to said shaft for rotation in unison therewith and movable longitudinally in relation thereto; a cam follower roller carried by said head in operative engagement with said lobe of the cam; a plunger confined coaxially in the hollow of said shaft and rigidly connecting said clutch member to said head; means for actuating said plunger toward a first position in which said clutch member operatively connects said power source member to said shaft when said cam follower roller is in a first position on said cam lobe, said cam lobe being formed to retract the clutch member from said power source member and engage said clutch member with said brake member when said roller is in a second position on said lobe, a first detent member fixed on said cam, and a second relatively movable detent member engageable with said first detent member to stop rotation of said cam in a predetermined position, said second detent member being movable to a cam release position.

2. Clutch mechanism in accordance with claim 1 in which said means for actuating said plunger toward said first position includes spring means biasing said plunger toward said position.

3. Clutch mechanism in accordance with claim 2 in which said spring means comprises a coiled compression spring confined in the hollow of said shaft and operatively connected to said plunger.

4. Clutch mechanism in accordance with claim 1 in which said cam has a pair of lobes projecting from a face thereof and in which said head carries a pair of cam follower rollers severally disposed in operative engagement with the respective lobes of the cam.

5. Clutch mechanism in accordance with claim 1 in which said first detent member comprises a peripheral lobe on said cam having a recess disposed to receive and interlock with said second detent member.

6. Clutch mechanism in accordance with claim 2 in which the lobe of said cam has an inclined arcuate segment formed to coact with said cam follower roller to turn said cam on the shaft by wedge action and release said plunger to its first position under pressure exerted by said spring means, when said roller is in said second position on the lobe and the second detent member is in the cam release position.

7. Cycle clutch mechanism comprising, a hollow rotary shaft having a supporting bearing; a rotary power source member revolubly mounted on a first end portion of said shaft and adapted to be rotated continuously; a clutch disk mounted on said shaft adjacent to said power source member and having a splined connection with said shaft, said disk being movable along said shaft to and from driving engagement with said power source member; a fixed brake member engageable by said clutch disk when the disk is in a position retracted from said power source member; a cam rotatable on said shaft in longitudinally spaced relation to said clutch disk, said cam having a plurality of lobes projecting from a face thereof; a head connected to a second end portion of said shaft for rotation in unison therewith and movable longitudinally in relation thereto; anti-friction cam follower rollers carried by said head and projecting therefrom in operative engagement with the respective lobes of said cam; a plunger confined coaxially in the hollow of said shaft and rigidly connecting said clutch disk to said head; a spiral compression spring confined in the hollow of said shaft and operatively connected to said clutch disk to bias said disk toward a position in engagement with said power source; said cam follower rollers when in a first position in engagement with said cam lobes releasing said clutch disk for engagement with the power source member, said cam lobes being formed to retract the clutch disk from the power source member and engage said brake member with the clutch disk when said rollers are in a second position on said lobes; a first detent member formed on said cam, and a second relatively movable detent member engageable with said first detent member to stop rotation of said cam in a predetermined position, said second detent member being movable to a cam release position.

References Cited in the file of this patent

UNITED STATES PATENTS

| 1,048,840 | Littlefield | Dec. 31, 1912 |
| 2,069,741 | Hougland | Feb. 9, 1937 |
| 2,091,449 | Littell et al. | Aug. 31, 1937 |
| 2,971,620 | Rice | Feb. 14, 1961 |